(12) United States Patent
Kumar (10) Patent No.: US 7,882,138 B1
(45) Date of Patent: Feb. 1, 2011

(54) PROGRESSIVE EVALUATION OF PREDICATE EXPRESSIONS IN STREAMING XPATH PROCESSOR

(75) Inventor: Arun Kumar, Bangalore (IN)

(73) Assignee: Sonoa Networks India (PVT) Ltd., Bangalore (IN)

( * ) Notice: Subject to any disclaimer, the term of this patent is extended or adjusted under 35 U.S.C. 154(b) by 392 days.

(21) Appl. No.: 12/057,366

(22) Filed: Mar. 27, 2008

Related U.S. Application Data (63) Continuation-in-part of application No. 12/056,292, filed on Mar. 27, 2008.

(51) Int. Cl.
*G06F 17/30* (2006.01)

(52) U.S. Cl. .................... 707/797; 709/203; 707/716

(58) Field of Classification Search ......... 707/713–720, 707/794–802, 755–763, 741–743, 776–780, 707/697–699; 709/203
See application file for complete search history.

(56) References Cited

U.S. PATENT DOCUMENTS

| | | | |
|---|---|---|---|
| 2004/0205082 A1 | 10/2004 | Fontoura | |
| 2004/0261019 A1 | 12/2004 | Imamura | |
| 2008/0235260 A1* | 9/2008 | Han et al. | 707/102 |
| 2008/0263109 A1* | 10/2008 | Patterson | 707/204 |
| 2008/0320075 A1* | 12/2008 | Livshits et al. | 709/203 |
| 2009/0234802 A1* | 9/2009 | Shinjo et al. | 707/2 |

OTHER PUBLICATIONS

Author: Yanlei Diao, Michael J. Franklin Title: "High-Performance XML Filtering: An Overview of YFilter" 2003.

Author: Yanlei Diao, Michael J. Franklin, Hao Zhang, Peter M. Fischer, Mehmet Altinel Title: "Path Sharing and Predicate Evaluation for High-Performance XML Filtering" Dec. 2003 ACM Transactions on Database Systems (TODS), vol. 28 Issue 4 Publisher: ACM.

Author: Ashish Kumar Gupta, Dan Suciu Title: "Stream Processing of XPath Queries with Predicates" Publication: Jun. 2003 SIGMOD '03: Proceedings of the 2003 ACM SIGMOD international conference on Management of data.

* cited by examiner

*Primary Examiner*—Wilson Lee
(74) *Attorney, Agent, or Firm*—Kanika Radhakrishnan; Evergreen Valley Law Group, P.C.

(57) ABSTRACT

Progressive evaluation of predicate expressions in streaming XPath processor. A method for evaluating multiple XPath predicate expressions of multiple XPath queries includes identifying includes determining hit of a location path in a SAX event. All XPath predicate expressions of all XPath queries corresponding to the location path are then identified. All leaf nodes in the XPath predicate expressions corresponding to the location path are then determined. Thereafter, storage of nearest parent nodes of the leaf nodes is checked. Each nearest parent node is a first parent node which is encountered while moving from a leaf node towards a root node in an XPath predicate expression and which requires storage for storing intermediate Boolean result. Results of parent nodes of the leaf nodes are the determined based on the checking. Thereafter, the results of the parent nodes are stored if the results of the parent nodes are Boolean results. Further, results of root nodes of the XPath predicate expressions are determined by progressively evaluating subsequent parent nodes of the parent node.

7 Claims, 6 Drawing Sheets

PROGRESSIVE EVALUATION OF PREDICATE EXPRESSIONS IN STREAMING XPATH PROCESSOR

CROSS REFERENCE TO RELATED APPLICATIONS

This application is a Continuation-in-Part of co-pending U.S. patent application Ser. No. 12/056,292 filed Mar. 27, 2008 which is expressly incorporated by reference herein in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technical Field

Embodiments of the invention relate generally to the field of Extensible Markup Language (XML) messages and more particularly to evaluation of XPath predicate expressions in an online stream of XML messages.

2. Prior Art

Hypertext Markup Language (HTML) is a markup language designed for the creation of web pages with hypertext and other information to be displayed in a web browser. XML is a metalanguage describing structure of data and is not a fixed set of elements like HTML. Over a period of time, the use of XML as a data exchange format has increased tremendously.

XPath is an expression language used for addressing XML messages. XPath also provides basic facilities for manipulation of strings, numbers and Booleans. XPath operates on logical structure of XML messages. At any given point of time an XPath processor receives several streams of the XML messages. The XPath processor also receives several user profiles or preferences in the form of XPath queries. An XPath query includes one or more location steps, for example, //book[Price>50 and Publisher="Prentice Hall"]. A location step includes an axis, for example, "//", a node test, for example, "book" and zero or more XPath predicate expressions, for example, [Price>50 and Publisher="Prentice Hall"]. An XPath predicate expression filters a node test with respect to an axis. Location paths taking part in the XPath predicate expressions include //book/price and //book/publisher. A location path describes how a specific part of the XML messages may be found. Location paths describe address of one node with respect to another. The XPath predicate expressions need to be evaluated on the XML messages to select the appropriate results for the XPath predicate expressions and the XPath queries. As the number of XPath predicate expressions and the streams of the XML messages are huge, an efficient technique for evaluating the XPath predicate expressions is needed.

Currently one technique available for evaluating an XPath predicate expression includes creating a document object model (DOM) for an XML message. The XPath predicate expression is then evaluated on the DOM. However, the XML message needs to be stored for creating DOM which leads to inefficient utilization of memory. Many times the XML message is huge which places strain on system resources. Further, output of the XPath predicate expression is also delayed as the XPath predicate expression is evaluated when the XML message is completely received and the DOM is created. Moreover, if the XML message arrives in part it increases the delay.

In order to address challenges posed by DOM approach, alternative approaches such as Simple API for XML (SAX) have evolved. SAX refers to presenting the XML message as a specialized stream of events. In other words, SAX is event driven and relies on a programmer to specify a particular event. Upon the happening of such specified event, XPath predicate expression processing happens.

An XML filtering system includes an XPath parser and a filtering engine. The XPath parser receives the XPath queries, parses them and sends the parsed results to the filtering engine which is then converted into an internal representation.

Various filtering approaches are known today, for example, X-filter and Y-filter algorithms. According to Y-filter algorithm, before handling the SAX events, the XML filtering system parses the XPath queries and generates a Nondeterministic Finite Automation (NFA). NFA refers to intermediate data structure generated by parsing the XPath queries. An arriving XML message is parsed and the SAX based events raised by the XML parser callback the handlers and drive the transitions in the NFA.

A technique for evaluating an XPath predicate expression using SAX based events is out of line predicate evaluation. The XPath predicate expression is modeled in the form of a logical ordered tree including a root node and several leaf nodes. The root node is a top node in a tree and leaf node is a terminal node. The XML message is received and parsed to raise SAX based events. The XPath predicate expression is then evaluated on the SAX events. The evaluation starts from root node of the tree of the XPath predicate expression. Thereafter, the evaluation proceeds to child nodes of the root node and then to subsequent child nodes of these child nodes. However, the evaluation starts only after parsing of the XML message is complete which causes delay in output. Further, data for XML nodes participating in the XPath predicate expression evaluation is stored which leads to inefficient utilization of memory.

U.S. patent application publication (20070250471A1), discloses a method for running XPath queries over XML streams with incremental predicate evaluation. The method includes evaluating one XPath query at a time. However, as the number of XPath queries that need to be evaluated are huge, evaluating XPath queries one by one leads to time inefficiency.

In light of the foregoing discussion, there is a need for an efficient method and system for evaluation of XPath predicate expressions.

SUMMARY

Embodiments of the invention described herein provide a method and system for evaluating XPath predicate expressions on an online stream of Extensible Markup Language (XML) messages.

In an embodiment of the invention, an XPath predicate expression is modeled in the form of a logical ordered tree including a root node and several leaf nodes. The root node is a top node in the tree and leaf nodes are terminal nodes. An XML message is received and parsed to raise Simple API for XML (SAX) events. The XPath predicate expressions of multiple XPath queries are then evaluated on the SAX events.

An example method includes determining hit of a location path in a SAX event. All XPath predicate expressions of all XPath queries corresponding to the location path are then identified. All leaf nodes in the XPath predicate expressions corresponding to the location path are then determined. Thereafter, storage of nearest parent nodes of the leaf nodes is checked. Each nearest parent node is a first parent node which is encountered while moving from a leaf node towards a root node in an XPath predicate expression and which requires storage for storing intermediate Boolean result. Results of parent nodes of the leaf nodes are the determined based on the checking. Thereafter, the results of the parent nodes are stored if the results of the parent nodes are Boolean results. Further, results of root nodes of the XPath predicate expressions are determined by progressively evaluating subsequent parent nodes of the parent node.

An example machine-readable medium product includes instructions operable to cause a programmable processor to perform determining hit of a location path in a SAX event. All XPath predicate expressions of all XPath queries corresponding to the location path are then identified. All leaf nodes in the XPath predicate expressions corresponding to the location path are then determined. Thereafter, storage of nearest parent nodes of the leaf nodes is checked. Each nearest parent node is a first parent node which is encountered while moving from a leaf node towards a root node in an XPath predicate expression and which requires storage for storing intermediate Boolean result. Results of parent nodes of the leaf nodes are the determined based on the checking. Thereafter, the results of the parent nodes are stored if the results of the parent nodes are Boolean results. Further, results of root nodes of the XPath predicate expressions are determined by progressively evaluating subsequent parent nodes of the parent node.

An example system includes a location module for determining hit of a location path in a SAX event. The system also includes a predicate leaf node identification module for identifying all XPath predicate expressions of all XPath queries corresponding to the location path and determining all leaf nodes in the XPath predicate expressions corresponding to the location path. Further, the system includes a checking module for checking storage of nearest parent nodes of the leaf nodes, wherein each nearest parent node is first parent node which is encountered while moving from a leaf node towards a root node in an XPath predicate expression and which requires storage for storing intermediate Boolean result. The system also includes an evaluation module determining results of parent nodes of the leaf nodes based on the checking and determining results of root nodes of the XPath predicate expressions by progressively evaluating subsequent parent nodes of the parent nodes. Further, a storage module for storing the results of the parent nodes if the results of the parent nodes are Boolean results is also included.

DETAILED DESCRIPTION OF THE EMBODIMENTS

Figure 1:
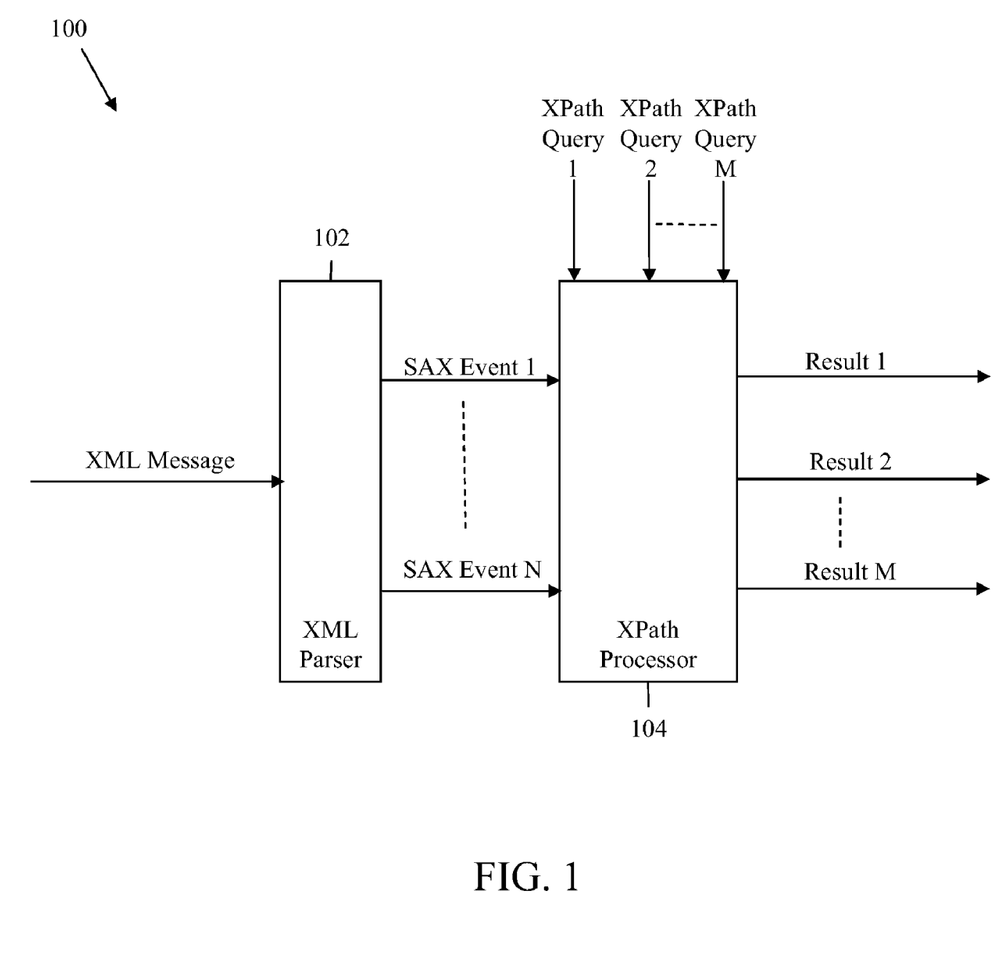
FIG. 1 is a block diagram of an environment in accordance with an embodiment of the invention.

FIG. 1 is a block diagram of an environment 100 in accordance with an embodiment of the invention. Environment 100 includes an XML parser 102 and an XPath processor 104. XML parser 102 receives several online streams of XML messages. XML parser 102 includes an application program interface (API), for example, Simple API for XML (SAX), for parsing XML messages. XML parser 102 parses an XML message to create SAX events, for example, SAX event 1. A SAX event may include XML text nodes, XML element nodes, XML processing instructions, XML comments, and a sequence of SAX events. XPath processor 104 subscribes to SAX events from XML parser 102.

XPath processor 104 also receives several XPath predicate expressions included in XPath queries. XPath queries are user profiles or preferences in an XPath format. An XPath query, for example, XPath query 1 may include a group of XPath queries. The XPath query includes one or more location steps, for example, //book[Price>50 and Publisher="Prentice Hall"]. A location step includes an axis, for example, "/", a node test, for example, "book" and zero or more XPath predicate expressions, for example, [Price>50 and Publisher="Prentice Hall"]. Location paths taking part in the XPath predicate expression include //book/price and //book/publisher. A location path describes how a specific part of the XML messages may be found. Location paths describe address of one node with respect to another. The evaluation of the XPath predicate expression [Price>50 and Publisher="Prentice Hall"] gives results having price greater than 50 and having publisher as "Prentice Hall".

XPath processor 104 reads the SAX events one by one and processes several XPath predicate expressions of multiple XPath queries simultaneously on the SAX event.

Embodiments of the invention are implemented using Y-filter algorithm. The XPath queries are compiled yielding in Nondeterministic Finite Automata, which is hash table tree according to Y-filter algorithm. The Nondeterministic Finite Automata is used during the runtime of XPath processor 104 for evaluating XPath queries in response to SAX events.

XPath processor 104 may include several modules for evaluating the XPath predicate expressions. XPath processor 104 including several modules is explained in detail in conjunction with FIG. 2.

Figure 2:
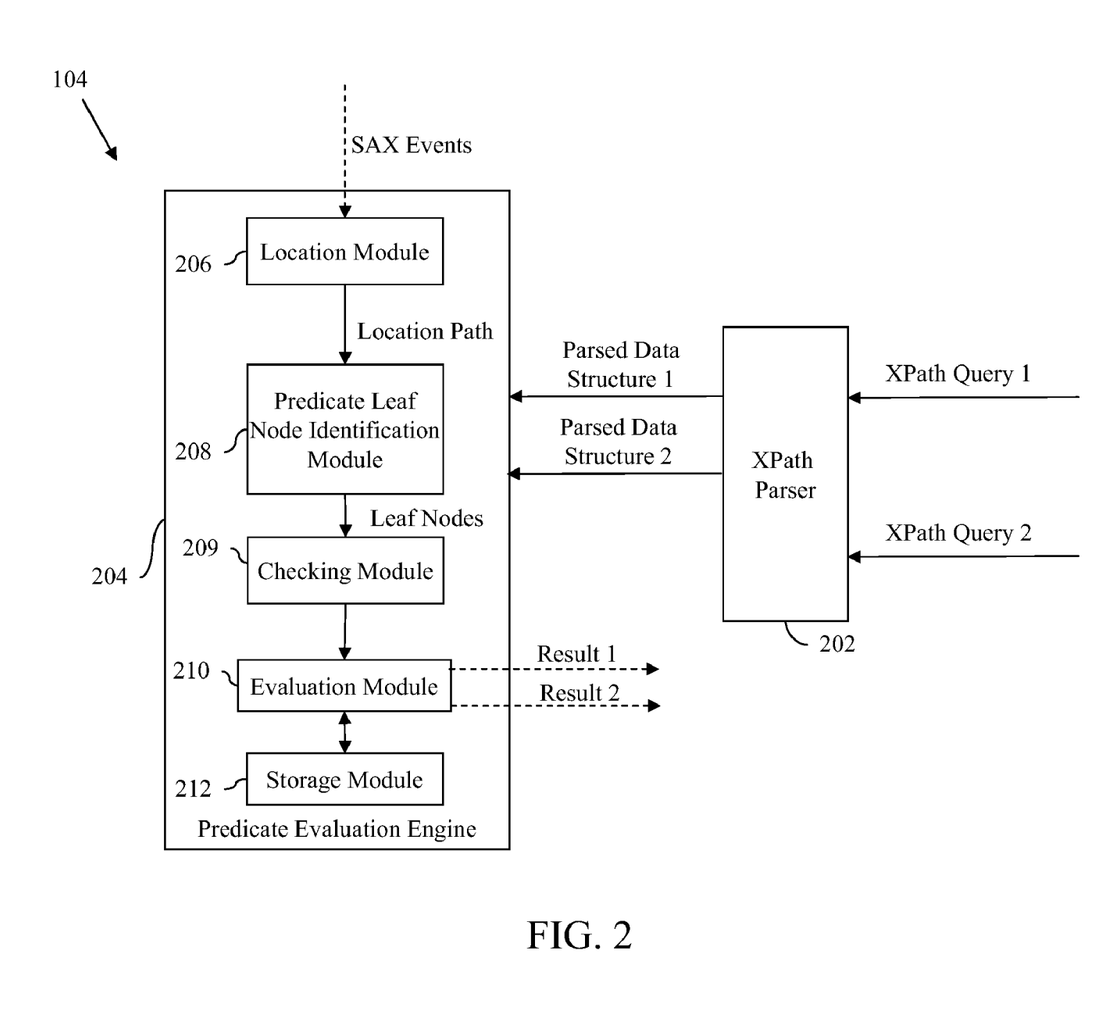
FIG. 2 is a schematic representation of an XPath processor in accordance with an embodiment of the invention.

FIG. 2 is a schematic representation of an XPath processor 104 in accordance with an embodiment of the invention. XPath processor 104 includes an XPath parser 202 and a predicate evaluation engine 204 including a location module 206, a predicate leaf node identification module 208, a checking module 209, an evaluation module 210 and a storage module 212.

XPath parser 202 receives several XPath queries. Each XPath query includes zero or more XPath predicate expressions. XPath parser 202 parses several XPath predicate expressions to form parsed data structures and sends the parsed data structures to predicate evaluation engine 204. One XPath predicate expression has one parsed data structure. In an embodiment of the invention, a storage space is created or allocated in storage module 212 during parsing of each XPath predicate expression.

The parsed data structures includes nodes arranged in parent-child hierarchical structure. Examples of nodes include but are not limited to binary node, relational node, logical node, operative node, arithmetic node, element node and constant node. In an embodiment of the invention, a parsed data structure includes a root node, several leaf nodes and one or more intermediate nodes. The root node is a top node in the parsed data structure. The leaf nodes are terminal nodes of the parsed data structure. The one or more intermediate nodes include parent nodes of the leaf nodes and subsequent parent nodes of the parent nodes.

Location module 206 receives an online stream of XML message in form of SAX events and reads the SAX events one by one. Location module 206 determines hit of a location path in a SAX event.

Predicate leaf node identification module 208 identifies all XPath predicate expressions of all XPath queries corresponding to the location path. The location path has different path identification (ids) for different XPath queries. These path ids are used as key to obtain the parsed data structures of the XPath predicate expressions of the XPath queries. After identification of the XPath predicate expressions having the location path which is hit, all leaf nodes corresponding to the location path are determined by predicate leaf node identification module 208. The leaf nodes are terminal nodes in the identified XPath predicate expressions. The content of the SAX event is identified as the value of all such leaf nodes.

Checking module 209 checks storage of nearest parent nodes of the leaf nodes. A nearest parent node is first parent node which is encountered while moving from a leaf node towards a root node in an XPath predicate expression and which requires storage for storing intermediate Boolean result.

Evaluation module 210 determines results of parent nodes of all the leaf nodes.

Storage module 212 stores results of all parent nodes for which evaluation results in a Boolean result "True" or "Yes". Storage module 212 stores results for intermediate parent nodes yielding the Boolean result "True" or "Yes". Storage module 212 also stores result for root node yielding the Boolean result "True" or "Yes" which is the result of the XPath predicate expression.

Predicate leaf node identification module 208, evaluation module 210 and storage module 212 may include one or more algorithms. In an embodiment of the invention, predicate leaf node identification module 208 may perform the function of location module 206 and vice versa.

Figure 3A:
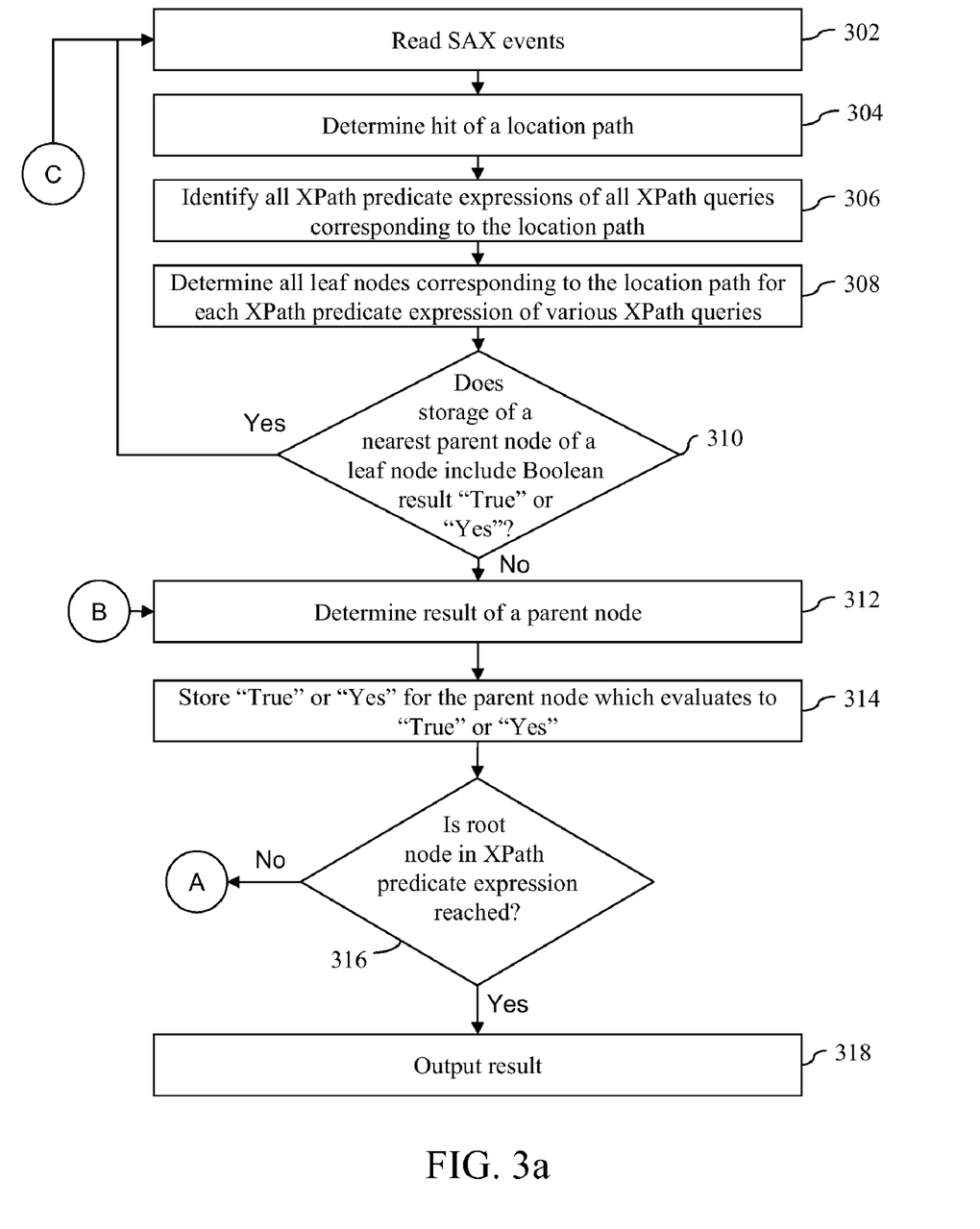
FIGS. 3a and 3b depict a flowchart illustrating a method for evaluating XPath predicate expressions in accordance with an embodiment of the invention.
Figure 3B:
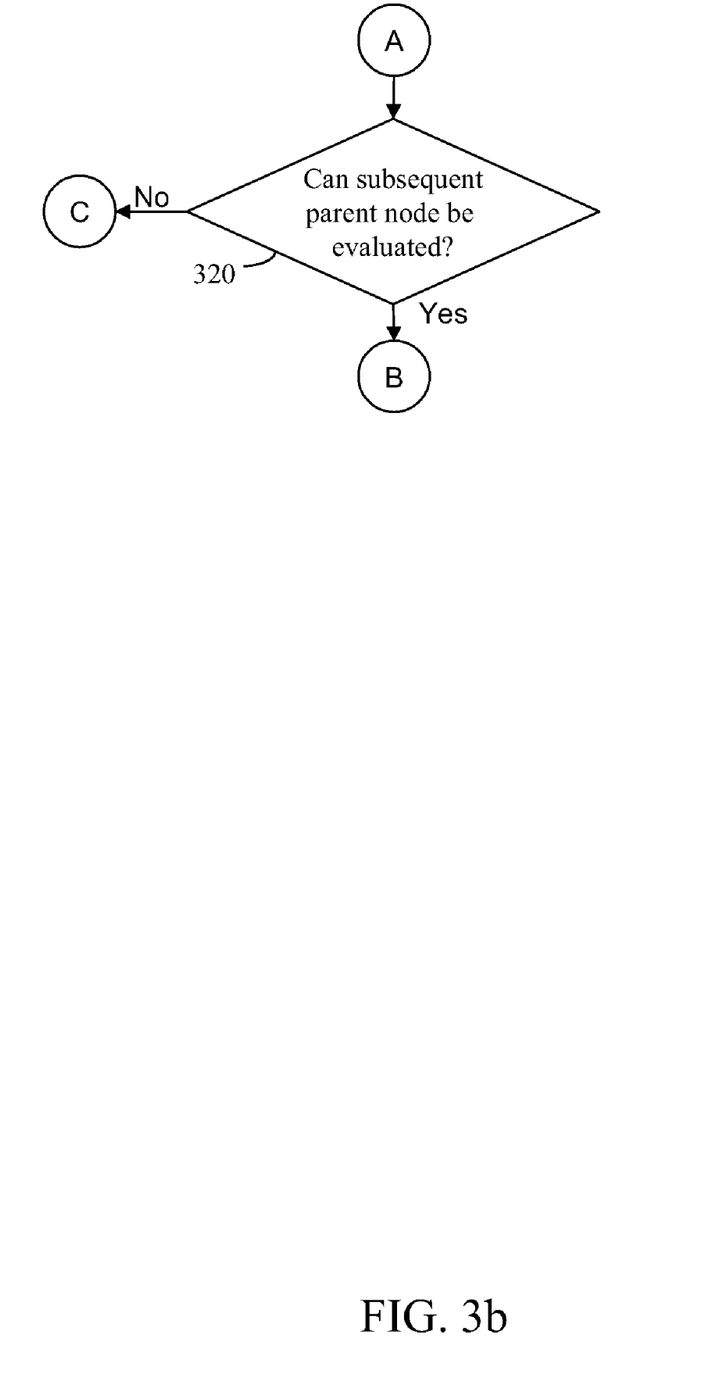

FIGS. 3a and 3b depict a flowchart illustrating a method for evaluating XPath predicate expressions in accordance with an embodiment of the invention. Several XPath queries including user profiles or preferences are received. Each XPath query includes zero or more XPath predicate expressions. Several XPath predicate expressions are evaluated simultaneously. XPath predicate expressions are parsed to form parsed data structures. One XPath predicate expression has one parsed data structure.

In an embodiment of the invention, all the nodes which may yield Boolean results "True" or "Yes" are identified during the parsing. Storage space is then created or allotted for all such identified nodes during the parsing of the XPath predicate expressions. The size for the storage is obtained from the parse data structures.

At step 302, an online stream of SAX events is received and the SAX events are read one by one. The SAX events are a parsed structure of an XML message.

At step 304, hit of a location path is determined. The hit is determined by encountering an XML element or an XML attribute in the SAX event which is required in the XPath predicate expressions of various XPath queries. Location paths describe the address of one node with respect to another. The hit indicates that the location path is in an accepting state reached by Y-filter Nondeterministic Finite Automation (NFA) algorithm. In an embodiment of the invention, the hit is determined only once for the location path in a particular SAX event.

At step 306, all XPath predicate expressions of all XPath queries corresponding to the location path which is hit are identified. In an embodiment of the invention, the location path has different path identifications (ids) for different XPath queries. These path ids are used as key to obtain the parsed data structures of the XPath predicate expressions of the XPath queries during compilation time. Multiple XPath predicate expressions are then processed.

In an embodiment of the invention, a checking is performed to find if the storage for the XPath predicate expressions including the location path which is hit are created. The check is performed in runtime. In case the storage or a predicate result buffer does not exist then the storage may be created by obtaining size and other necessary information from the parse data structures.

Thereafter, at step 308, all leaf nodes in all XPath predicate expressions of all XPath queries corresponding to the location path that is hit are determined. In an embodiment of the invention, all leaf nodes that are determined corresponding to the location path have a common element or attribute. The content or current data of the location path is the value of all such determined leaf nodes.

In an embodiment of the invention, steps 310 to step 320 is performed for all XPath predicate expressions of all XPath queries including the location path which is hit.

Thereafter, at step 310, a check is performed to find whether storage of a nearest parent node of the leaf node includes the Boolean result "True" or "Yes". The nearest parent node is first parent node which is encountered while moving from the leaf node towards the root node in the parsed data structure and which requires storage for storing intermediate Boolean result "True" or "Yes". The nearest parent node that requires storage is obtained from the parsed data structure.

If the storage, at step 310, includes the Boolean result "True" or "Yes" then process moves to step 302 where next SAX event is read.

If the storage does not include the Boolean result "True" or "Yes" then step 312 is performed. At step 312, the result of the parent node of the leaf node is determined based on value of each child node of the parent node. For example, if the leaf node is a left child and the parent node is a binary node having right child as a constant node then the result of the parent node is determined by performing the desired calculation. In an embodiment of the invention, the parent node may be the nearest parent node.

Thereafter, at step 314, a Boolean result "True" or "Yes" is stored for the parent node which evaluates to True in the respective allotted storage space.

At step 316, a check is performed to find if root node in the XPath predicate expression has reached. In an embodiment of the invention, it is checked if the parent node which is evaluated is the root node in its respective parsed data structures. For all the XPath predicate expressions having the parent node as the root node the result is outputted at step 318.

If the root node is not reached step 320 is performed. At step 320, a check is performed to find whether result of subsequent parent node of the parent node can be evaluated. The check is performed by determining availability of result of each child node of the subsequent parent node. If result of the each child node is available then the process moves to step 312 where result of the subsequent parent node is determined. The subsequent parent node is then considered as the parent node. For example, if the parent is a binary node and result of both the right child and left child are available then the result of the parent may be determined.

If result of each child node is not available and hence, result of subsequent parent node of the parent node cannot be evaluated then the process moves to step 302 where next SAX event is read.

In an embodiment of the invention, a pseudocode for progressive evaluation of the XPath predicate expressions is as follows:

Input: Accepting State from NFA runtime engine
Whenever an accepting state is reached by Y-Filter NFA algorithm this function is called.
Output: If it is determined that the content of a LocationPath used in a predicate expression is required then intermediate results of the predicate expression get stored. If a whole predicate expression could be evaluated then its complete result is stored. This is done for every LocationPath present in the input Accepting State and for those Location Paths that are part of predicate expressions.

for each LocationPathId in Accepting State List
    Obtain LocationPath datastructure using LocationPathId
    Using the parent pointer of each expression node starting from the LocationPath node which is always a leaf node, we can get the whole expression tree of which the current LocationPath is part of.
    Starting from the LocationPath which is a leaf node of a predicate expression check if the current data of LocationPath is required or not needed.
    If current data of LocationPath is not needed continue;
    Check if Predicate Result Buffer is already created and exists at known location in the NFA runtime stack.
    if Predicate Result Buffer does not exist
        From the selected expression tree get size of intermediate result storage.
        Create Predicate Result Buffer of required size.
        Store Predicate Result Buffer at known location in the chosen NFA runtime stack element.
    evaluateBottomUp(LocationPath, CurrentLocationPathData)

In an embodiment of the invention, a pseudocode for bottom up evaluation of the XPath predicate expressions is as follows:

Input: ChildExpressionNode
ChildResult
Output: If the whole expression tree can be evaluated then its complete result is stored. If only part of the expression can be evaluated then intermediate results of those nodes that yield boolean result are stored.

Get ParentNode of ChildExpressionNode
/*
    ParentNode is NULL if the root node of the expression tree is reached.
    Then the current node is the root node and current node's result is the result of the whole expression.
*/
if ParentNode is NULL
    Set ChildResult as Expression Result in Predicate Result Buffer available at known level of NFA runtime stack.
    return
If ParentNode has more than one child
    for each child
        if CurrentChild is ChildExpressionNode
            continue
        evaluateChildNode(CurrentChild)//This is top down evaluation
        if result is obtained and if result type is boolean
            Store intermediate boolean result in the Predicate Result Buffer using CurrentChildNode Id. Predicate Result Buffer is available at known level of NFA runtime stack.
    If NOT all Children yielded result
        return Compute Result of ParentNode
if result type is boolean
    Store intermediate boolean result in the Predicate Result Buffer using ParentNode Id. Predicate Result Buffer is available at known level of NFA runtime stack evaluateBottomUp(ParentNode, ParentNodeResult)

Figure 4:
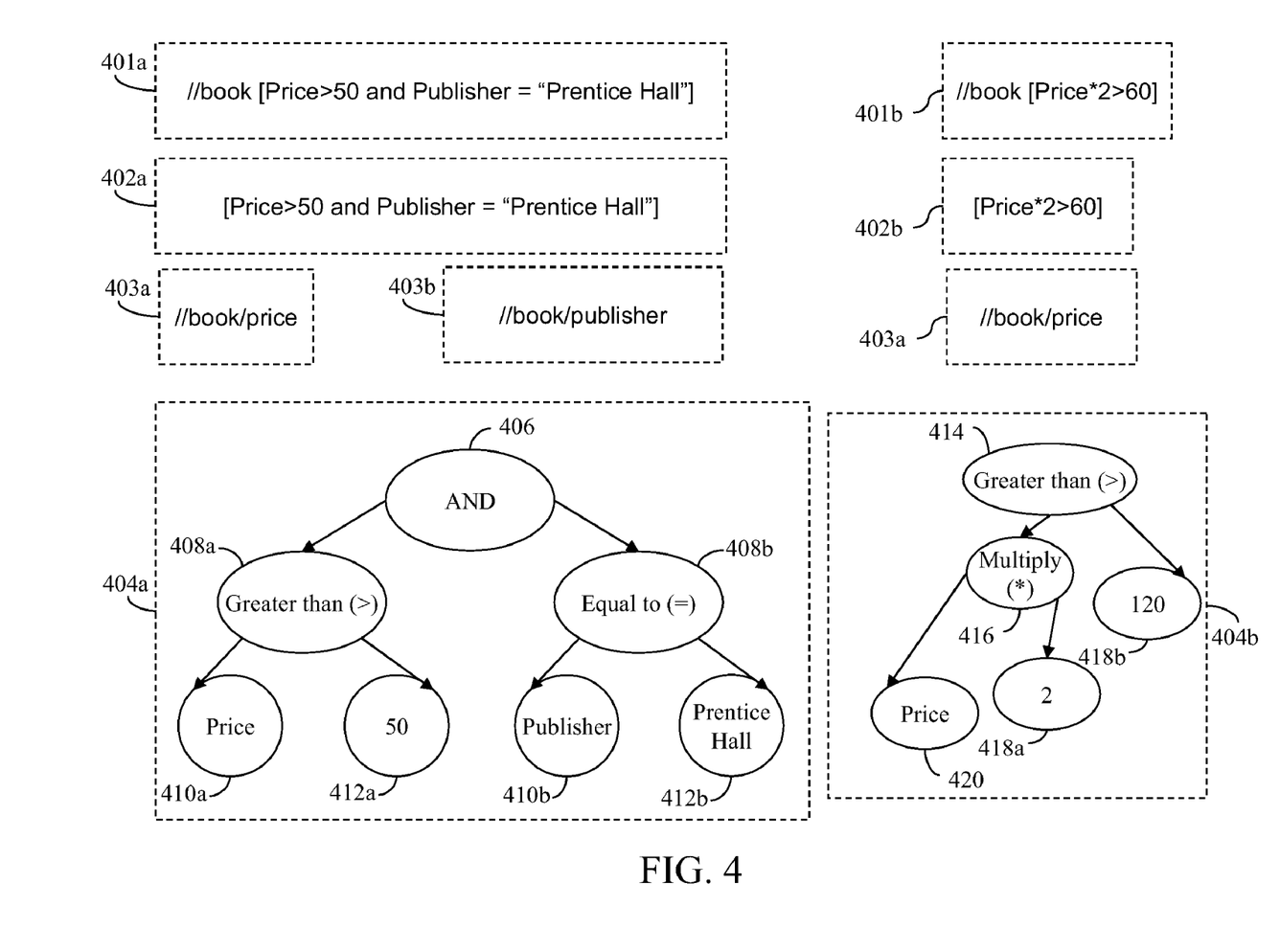
FIG. 4 is a schematic representation of exemplary XPath queries, XPath predicate expressions and their parsed data structures in accordance with an embodiment of the invention.

The method described above is explained in detail with the help of an example in conjunction with FIG. 4.

FIG. 4 is a schematic representation of exemplary XPath query 401a including XPath predicate expression 402a with parse data structure 404a, and XPath query 401b including XPath predicate expression 402b with parsed data structure 404b in accordance with an embodiment of the invention.

XPath query 401a includes two location paths 403a and 403b. Location paths 403a and 403b have path identifications (ids) which acts as key to obtain parsed data structure 404a of XPath predicate expression 402a. Parsed data structure 404a includes a root node 406, a plurality of parent nodes including a parent node 408a and a parent node 408b, and a plurality of leaf nodes including a leaf node 410a, a leaf node 410b, a leaf node 412a and a leaf node 412b. Parse data structure 404a has three nodes which require storage as these three nodes are capable of yielding Boolean result "True" or "Yes". The three nodes include root node 406, parent node 408a and parent node 408b.

XPath query 401b includes a location path 403a. Location path 403a has a different path identification (ids) corresponding to parse data structure 404b which acts as key to obtain parsed data structure 404b of XPath predicate expression 402b. Parsed data structure 404b includes a root node 414, a parent node 416 and a plurality of leaf nodes including a leaf node 418a, a leaf node 418b and a leaf node 420. Parse data structure 404b has root node 414 which require storage as root node 414 is capable of yielding Boolean result "True" or "Yes".

XPath predicate expression 402a includes criteria 'rice>50 and Publisher="Prentice Hall". Results of XPath predicate expression 402a include all results having price greater than 50 and having publisher as "Prentice Hall". Parsed data structure 404a is a logically ordered tree of XPath predicate expression 402a including several nodes with parent-child hierarchical structure. Root node 406 is a top node of parsed data structure 404a. Leaf node 410a and leaf node 412a are child nodes of parent node 408a. Parent node 408a and parent node 408b are child nodes of root node 406. Root node 406 is also a subsequent parent node of parent node 408a and 408b.

XPath predicate expression 402b includes criteria 'rice*2>60'. Results of XPath predicate expression 402b include all results having price*2 greater than 60. Parsed data structure 404b is a logically ordered tree of XPath predicate expression 402b including nodes with parent-child hierarchical structure. Root node 414 is a top node of parsed data structure 404b. Root node 414 is a subsequent parent node of parent node 416. Root node 414 is also a parent node of leaf node 418b. Leaf node 418a and leaf node 420 are child nodes of parent node 416.

SAX events are received and read one by one. A hit of a location path is then determined. The hit is determined by encountering an element or attribute during reading of the SAX event. For example, encountering "price=70" indicates hit of location path 403a. XPath expression 402a of XPath query 401a and XPath expression 402b of XPath query 401b including location path 403a are then identified using path ids. The path ids are different for XPath query 401a and XPath query 401b. Using the path ids parsed data structure 404a and parsed data structure 404b is obtained. Leaf node 410a and leaf node 420 corresponding to location path 403a are then determined using parsed data structure 404a and parsed data structure 404b. Value of leaf node 410a and leaf node 420 is then identified as "price=70" which is the current value of location path 403a.

For XPath predicate expression 402a the following steps are then performed:

Nearest parent node to leaf node 410a that require storage for storing intermediate Boolean result "True" or "Yes" is then determined using parse data structure 404a. Parent node 408a is the nearest parent node to leaf node 410a which may yield a Boolean result and which requires storage. The storage of parent node 408a is checked to find if the storage includes a Boolean result "True" or "Yes". If the storage includes the Boolean result then the process waits till next SAX event is read.

In an embodiment of the invention, the storage does not include Boolean result. Parent node 408a then receives the evaluation including the value of leaf node 410a. Parent node 408a then requests and receives value of leaf node 412a. Leaf node 412a is a constant node and has a value 50. Thereafter, parent node 408a determines its result using the values of leaf node 410a and leaf node 412a. As 70 is greater than 50 a Boolean result "True" is stored as the result of parent node 408a.

A check is then performed to find if parent node 408a is root node. In an embodiment of the invention, the information is obtained from parse data structure 404a.

In an embodiment of the invention, parent node 408a is not root node. Thereafter, the evaluation moves to subsequent parent node of parent node 408a. In this example, subsequent parent node for parent node 408a is root node 406. Root node 406 then checks availability of parent node 408b. If the result of parent node 408b is true then result of root node 406 is determined, stored and output for XPath predicate expression 402a is sent.

In an embodiment of the invention, result of parent node 408b may not be available and hence, root node 406 cannot be evaluated. The process then waits till next SAX event is read.

Similarly, for XPath predicate expression 402b the following steps are performed:

Nearest parent node to leaf node 420 that require storage is then determined using parse data structure 404b. Root node 414 is the nearest parent node to leaf node 420 which may yield a Boolean result and which requires storage. The storage of root node 414 is checked to find if the storage includes a Boolean result "True" or "Yes". If any storage includes the Boolean result then the process waits till next SAX event is read.

In an embodiment of the invention, the storage does not include Boolean result. Parent node 416 then receives the evaluation including the value of leaf node 420. Parent node 416 requests and receives value of leaf node 418a. Leaf node 418a is a constant node and has a value 2. Thereafter, parent node 416 determines its result using the values of leaf node 420 and leaf node 418a.

A check is then performed to find if parent node 416 is a root node. In an embodiment of the invention, the information is obtained from parse data structure 404b.

In an embodiment of the invention, parent node 416 is not a root node. Thereafter, the evaluation moves to subsequent parent node of parent node 416. In this example, subsequent parent node for parent node 416 is root node 414. Root node 414 requests and receives value of leaf node 418b. Leaf node 418b is a constant node and has a value 120. Value of root node 414 is then determined as True as 140 (70*2) which is greater than 120. The value is stored and output for XPath predicate expression 402b is sent.

In an embodiment of the invention, result of parent node 408b is not available and hence, root node 406 cannot be evaluated. The process then moves and next SAX event is read.

The evaluation is then triggered when location path 403b including "Publisher" is hit in the SAX event. For example, if element or attribute "Publisher=Prentice Hall" is encountered then location path 403b is said to be hit. XPath predicate expression 402a of XPath query 401a is then identified using path id and leaf node 410b corresponding to location path 403b is determined. The value of leaf node 410b is identified as "Prentice Hall" which is current value of location path 403b. A nearest parent node, to leaf node 410b, which requires a storage is then determined. Parent node 408b is the nearest parent node which requires storage. Thereafter, the storage of parent node 408b is checked to find if the storage includes a Boolean result.

In an embodiment of the invention, the storage does not include Boolean result. Parent node 408b is then evaluated and result of parent node 408b is stored as True. A check is then performed to find if parent node 408b is root node 406.

In an embodiment of the invention, parent node 408b is not root node 406. The evaluation then moves to subsequent parent node of parent node 408b. Root node 406 is the subsequent parent node of parent node 408b. Root node 406 checks result of parent node 408a and finds the result as true. Result of root node 406 is then determined, stored and output for XPath predicate expression 402a is sent.

Evaluation of several XPath predicate expressions of multiple XPath queries is performed with minimal time delay. Further, the SAX event is read only once and multiple XPath queries are processed improving efficiency. The storing of Boolean result reduces memory requirement for storage. The storage also reduces time by preventing reevaluation of a part of the XPath predicate expressions for which already a Boolean result is stored. Moreover, the evaluation of any part of the XPath predicate expressions as and when data becomes available improves time-efficiency.

One or more steps of the method described in FIGS. 3a and 3b, and FIG. 4 may be implemented using a computer system. An exemplary computer system is explained in details in conjunction with FIG. 5.

Figure 5:
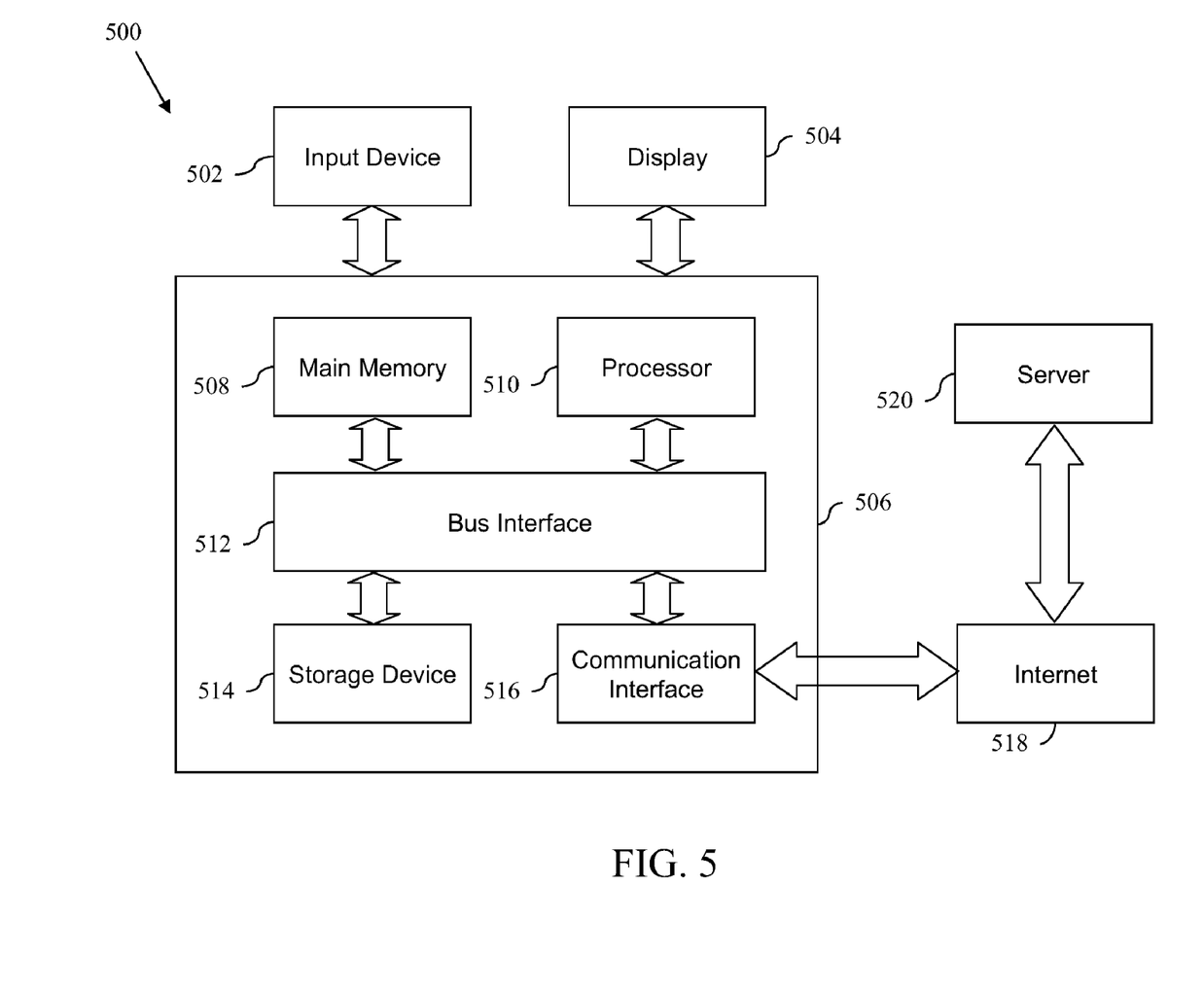
FIG. 5 is a block diagram of an exemplary computer system upon which various embodiments of the invention may be implemented.

FIG. 5 is a block diagram of an exemplary computer system 500 upon which various embodiments of the invention may be implemented. Computer system 500 includes a processing unit 506 including a main memory 508, such as a Random Access Memory (RAM) or other dynamic storage device, coupled to a bus interface 512 for storing information and instructions to be executed by processor 510. A storage device 514, such as a magnetic disk or optical disk, is provided and coupled to bus interface 512 for storing information and instructions. Computer system 500 may be coupled via bus interface 512 to a display 504 for displaying information to a user. An input device 502, including alphanumeric and other keys, is coupled to bus interface 512 for communicating information and command selections to processor 510.

Embodiments of the invention are related to the use of computer system 500 for implementing the techniques described herein. In an embodiment of the invention, those techniques are performed by computer system 500 in response to processor 510 executing one or more sequences of one or more instructions included in main memory 508. Such instructions may be read into main memory 508 from another machine-readable medium product, such as storage device 514. Execution of the sequences of instructions included in main memory 508 causes processor 510 to perform the method embodiment of the invention described herein. In alternative embodiments, hard-wired circuitry may be used in place of or in combination with software instructions to implement the invention. Thus, embodiments of the invention are not limited to any specific combination of hardware circuitry and software.

The term "machine-readable medium product" as used herein refers to any medium that participates in providing data that causes a machine to operation in a specific fashion. Examples of the machine-readable medium product include but are not limited to memory devices, tapes, disks, cassettes, integrated circuits, servers, online software, download links, installation links, and online links.

In an embodiment implemented using computer system 500, various machine-readable medium products are involved, for example, in providing instructions to processor 510 for execution. Computer system 500 also includes a communication interface 516 coupled to bus interface 512. Communication interface 516 provides a two-way data communication coupling to internet 518 that is coupled a server 520. Server 520 might transmit a requested code for an application program through internet 518 and communication interface 516.

The foregoing description sets forth numerous specific details to convey a thorough understanding of embodiments of the invention. However, it will be apparent to one skilled in the art that embodiments of the invention may be practiced without these specific details. Some well-known features are not described in detail in order to avoid obscuring the invention. Other variations and embodiments are possible in light of above teachings, and it is thus intended that the scope of invention not be limited by this Detailed Description, but only by the following Claims.

What is claimed is:

1. A method comprising:
   determining hit of a location path in a SAX event;
   identifying all XPath predicate expressions of all XPath queries corresponding to the location path;
   determining all leaf nodes in the XPath predicate expressions corresponding to the location path;
   checking storage of nearest parent nodes of the leaf nodes, wherein each nearest parent node is first parent node which is encountered while moving from a leaf node towards a root node in an XPath predicate expression and which requires storage for storing intermediate Boolean result;
   determining results of parent nodes of the leaf nodes based on the checking;
   storing the results of the parent nodes if the results of the parent nodes are Boolean results; and
   determining results of root nodes of the XPath predicate expressions by progressively evaluating subsequent parent nodes of the parent nodes, thereby avoiding evaluation of parts of the predicate expressions that yielded a Boolean result.

2. The method of claim 1 further comprising allocating memory for storing results of the parent nodes during parsing of the XPath predicate expressions.

3. The method of claim 1, wherein the Boolean result comprise "True" or "Yes".

4. A machine-readable storage medium comprising instructions operable to cause a programmable processor to perform:
   determining hit of a location path in a SAX event;
   identifying all XPath predicate expressions of all XPath queries corresponding to the location path;
   determining all leaf nodes in the XPath predicate expressions corresponding to the location path;
   checking storage of nearest parent nodes of the leaf nodes, wherein each nearest parent node is first parent node which is encountered while moving from a leaf node towards a root node in an XPath predicate expression and which requires storage for storing intermediate Boolean result;
   determining results of parent nodes of the leaf nodes based on the checking;
   storing the results of the parent nodes if the results of the parent nodes are Boolean results; and
   determining results of root nodes of the XPath predicate expressions by progressively evaluating subsequent parent nodes of the parent nodes, thereby avoiding evaluation of parts of the predicate expressions that yielded a Boolean result.

5. The machine-readable storage medium of claim 4 further comprising instructions operable to cause a programmable processor to perform allocating memory for storing results of the parent nodes during parsing of the XPath predicate expressions.

6. The machine-readable storage medium of claim 4, wherein the Boolean result comprise "True" or "Yes".

7. A system comprising:
   an XPath processor comprising:
   a location module for determining hit of a location path in a SAX event;
   a predicate leaf node identification module for identifying all XPath predicate expressions of all XPath queries corresponding to the location path and determining all leaf nodes in the XPath predicate expressions corresponding to the location path;
   a checking module for checking storage of nearest parent nodes of the leaf nodes, wherein each nearest parent node is first parent node which is encountered while moving from a leaf node towards a root node in an XPath predicate expression and which requires storage for storing intermediate Boolean result;
   an evaluation module determining results of parent nodes of the leaf nodes based on the checking and determining results of root nodes of the XPath predicate expressions by progressively evaluating subsequent parent nodes of the parent nodes; and
   a storage module for storing the results of the parent nodes if the results of the parent nodes are Boolean results.

* * * * *